United States Patent [19]

Ju

[11] Patent Number: 5,790,206
[45] Date of Patent: Aug. 4, 1998

[54] METHOD AND APPARATUS FOR GLOBAL-TO-LOCAL BLOCK MOTION ESTIMATION

[75] Inventor: Chi Hong John Ju, Hamilton Square, N.J.

[73] Assignee: David Sarnoff Research Center, Inc., Princeton, N.J.

[21] Appl. No.: 612,005

[22] Filed: Mar. 4, 1996

Related U.S. Application Data

[63] Continuation of Ser. No. 300,023, Sep. 2, 1994, abandoned.

[51] Int. Cl.⁶ .................................................. H04N 7/36
[52] U.S. Cl. .................................... 348/699; 348/413
[58] Field of Search .............................. 348/699, 402, 348/413, 416, 420

[56] References Cited

U.S. PATENT DOCUMENTS

| | | | |
|---|---|---|---|
| 4,796,087 | 1/1989 | Guichard et al. | 348/402 |
| 4,924,310 | 5/1990 | von Brandt | 348/416 |
| 5,006,929 | 4/1991 | Barbero et al. | 348/420 |
| 5,105,271 | 4/1992 | Niihara | 348/409 |
| 5,144,423 | 9/1992 | Knauer et al. | 348/402 |
| 5,148,269 | 9/1992 | de Haan et al. | 348/699 |
| 5,210,605 | 5/1993 | Zaccarin et al. | 348/416 |
| 5,351,095 | 9/1994 | Kerdranvat | 348/699 |
| 5,473,379 | 12/1995 | Horne | 348/416 |

*Primary Examiner*—Amelia Au
*Attorney, Agent, or Firm*—William J. Burke

[57] ABSTRACT

Apparatus and a concomitant method for estimating motion vectors having as an input a first image frame and a second image frame, each containing a plurality of pixels representing an image. The apparatus comprises: a pyramid processor for decimating a search area within the first image frame to produce a reduced resolution search area and for decimating a block of pixels in the second image frame to produce a reduced resolution pixel block; global search system for performing a global search within the reduced resolution search area using the reduced resolution pixel block until the reduced resolution pixel block substantially matches a matching block of pixels in the reduced resolution search area; and subsystem for computing an estimated motion vector representing a distance between a location of the reduced resolution pixel block within the second image frame and a location of the matching block of pixels within the first image frame.

14 Claims, 7 Drawing Sheets

METHOD AND APPARATUS FOR GLOBAL-TO-LOCAL BLOCK MOTION ESTIMATION

CROSS REFERENCE TO RELATED APPLICATION

This application is a continuation of patent application Ser. No. 08/300,023 entitled METHOD AND APPARATUS FOR GLOBAL-TO-LOCAL BLOCK MOTION ESTIMATION and filed on Sep. 2, 1994, now abandoned.

The invention relates generally to a system for encoding image sequences and, more particularly, to apparatus and a concomitant method for reducing the computational complexity in determining motion vectors for block-based motion estimation.

BACKGROUND OF THE INVENTION

An image sequence, such as a video image sequence, typically includes a sequence of image frames. The reproduction of video containing moving objects typically requires a frame speed of thirty image frames per second, with each frame possibly containing in excess of a megabyte of information. Consequently, transmitting or storing such image sequences requires a large amount of either transmission bandwidth or storage capacity. To reduce the necessary transmission bandwidth or storage capacity, the frame sequence is compressed such that redundant information within the sequence is not stored or transmitted. As such, image sequence compression through various encoding techniques has been the subject of a great deal of research in recent years. Television, video conferencing and CD-ROM archiving are applications which can benefit from video sequence encoding.

Generally, to encode an image sequence, information concerning the motion of objects in a scene from one frame to the next plays an important role in the encoding process. Because of the high redundancy that exists between consecutive frames within most image sequences, substantial data compression can be achieved using a technique known as motion estimation. For example, if there is no movement in a sequence, each frame in a sequence is identical to the preceding frame in that sequence. Therefore, the redundant frames do not have to be stored or transmitted. As such, a receiver, for example, can simply repeat a previously received frame to reproduce a sequence of identical frames without necessarily receiving each of the frames in the sequence. This no motion case is the simplest case in which the redundancy between consecutive frames of a video sequence can be exploited to predict a new frame using previous frames.

In general, however, there is at least some motion from one frame to the next in an image sequence. In a sequence containing motion, a current frame can be reconstructed using an immediately preceding frame and information representing the difference between the current and the immediately preceding frame. For example, in a simple image sequence transmission system, at the transmitter, a current frame is compared to a preceding frame to determine motion information, i.e., the difference between the two frames. Thereafter, the transmitter transmits the preceding frame and the motion information to a receiver. At the receiver, the current frame is reconstructed by combining the preceding frame with the motion information. Consequently, only 1 frame and difference information is transmitted and received rather than two entire frames. To further reduce the required bandwidth, the reference frame (e.g., the preceding frame) can be compressed using various subsampling techniques. In applications such as video conferencing, video telephone, and digital television, motion information has become the key to data compression. However, extraction of the motion information from the frame sequence is itself computationally intensive, placing a heavy burden on the hardware designed to perform the motion estimation task.

Many systems determine motion information using a so-called block based approach. For examples of various block based approaches, see U.S. Pat. Nos. 4,924,310 issued May 8, 1990, 5,105,271 issued Apr. 14, 1992, and 5,210,605 issued May 11, 1993. In a simple block based approach, the current frame is divided into a number of blocks of pixels (referred to hereinafter as the current blocks). For each of these current blocks, a search is performed within a selected search area in the preceding frame for a block of pixels that "best" matches the current block. This search is typically accomplished by repetitively comparing a selected current block to similarly sized blocks of pixels in the selected search area of the preceding frame. Once a block match is found, the location of matching block in the search area in the previous frame relative to the location of the current block within the current frame defines a motion vector. This approach, i.e., comparing each current block to an entire selected search area, is known as a full search approach or the exhaustive search approach. The determination of motion vectors by the exhaustive search approach is computationally intensive. A such, these systems tend to be relatively slow in processing the frames and expensive to fabricate.

Therefore, there is a need in the art for apparatus and a concomitant method of block motion estimation having less computational intensity than presently exists in the art.

SUMMARY OF THE INVENTION

The present invention overcomes the disadvantages of the prior art by providing a global-to-local block motion estimation apparatus and concomitant method for determining motion vectors in a computationally efficient manner. Specifically, the present invention utilizes a two-step process in which, first, a plurality of estimated motion vectors are produced, and second, the estimated motion vectors are refined to final motion vectors. The first step is accomplished by filtering and decimating a sequence of image frames such that the apparatus produces a sequence of low resolution frames. Each low resolution frame is partitioned into a plurality of blocks of pixels. Using the consecutive, low resolution frames, the apparatus performs an exhaustive search (hereinafter referred to as a global search) to produce estimated motion vectors.

In particular, within two selected low resolution frames (a current frame and a preceding frame), the apparatus respectively defines a plurality of current blocks of pixels and a plurality of preceding blocks of pixels. The preceding blocks are individual search areas having more pixels than the current blocks. The apparatus selects for processing a current block and a preceding block. The selected current block is then compared, using an exhaustive search strategy, to the selected search area until a block of pixels within the search area is found that substantially matches the current block. The distance between location of the matching block in the preceding frame and the location of the current block in the current frame defines an estimated motion vector. This search process repeats for each and every current block until the apparatus determines an estimated motion vector for each current block. Since the search is accomplished upon reduced (low) resolution images, the search is accomplished relatively quickly.

Once the estimated motion vectors are computed, the apparatus then selects preceding and current frames in the full resolution frame sequence that correspond to the low resolution frames used to estimate the motion vectors. Using these consecutive, full resolution frames and the estimated motion vectors, the apparatus performs a modified exhaustive search (hereinafter referred to as a local search) to produce final motion vectors. Specifically, within these full resolution frames, the apparatus partitions the frames into preceding blocks and a current blocks of pixels. These blocks within the full resolution frames correspond to the same blocks within the low resolution frames. As such, the preceding block defines a search area having a size that is larger than the current block. The apparatus searches the search area to determine a match between the current block and the search area. However, the estimated motion vector for a given low resolution current block provides a initial search starting location for the full resolution current block within the full resolution search area. As such, a match is rapidly found without performing an exhaustive search within the full resolution search area.

To improve the noise immunity of the global search, the low resolution current blocks are formed as metablocks. These metablocks are defined by a group of adjacent low resolution current blocks. Typically, the metablocks are partitioned into sub-blocks, where each sub-block contains a plurality of current blocks. The metablock is used in the global search in lieu of an individual current block. When a match is found for the metablock with pixels within the low resolution search area, a motion vector is computed for each sub-block within the metablock as well as the metablock as a whole. The apparatus assigns to each of the current blocks comprising the metablock an estimated motion vector. These motion vectors are selected from either the motion vector of the sub-block containing the current block, the motion vector associated with the metablock as a whole, or some combination of the sub-block and metablock motion vectors. Once, estimated motion vectors are assigned to the current blocks, a local search is completed as discussed above.

BRIEF DESCRIPTION OF THE DRAWING

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
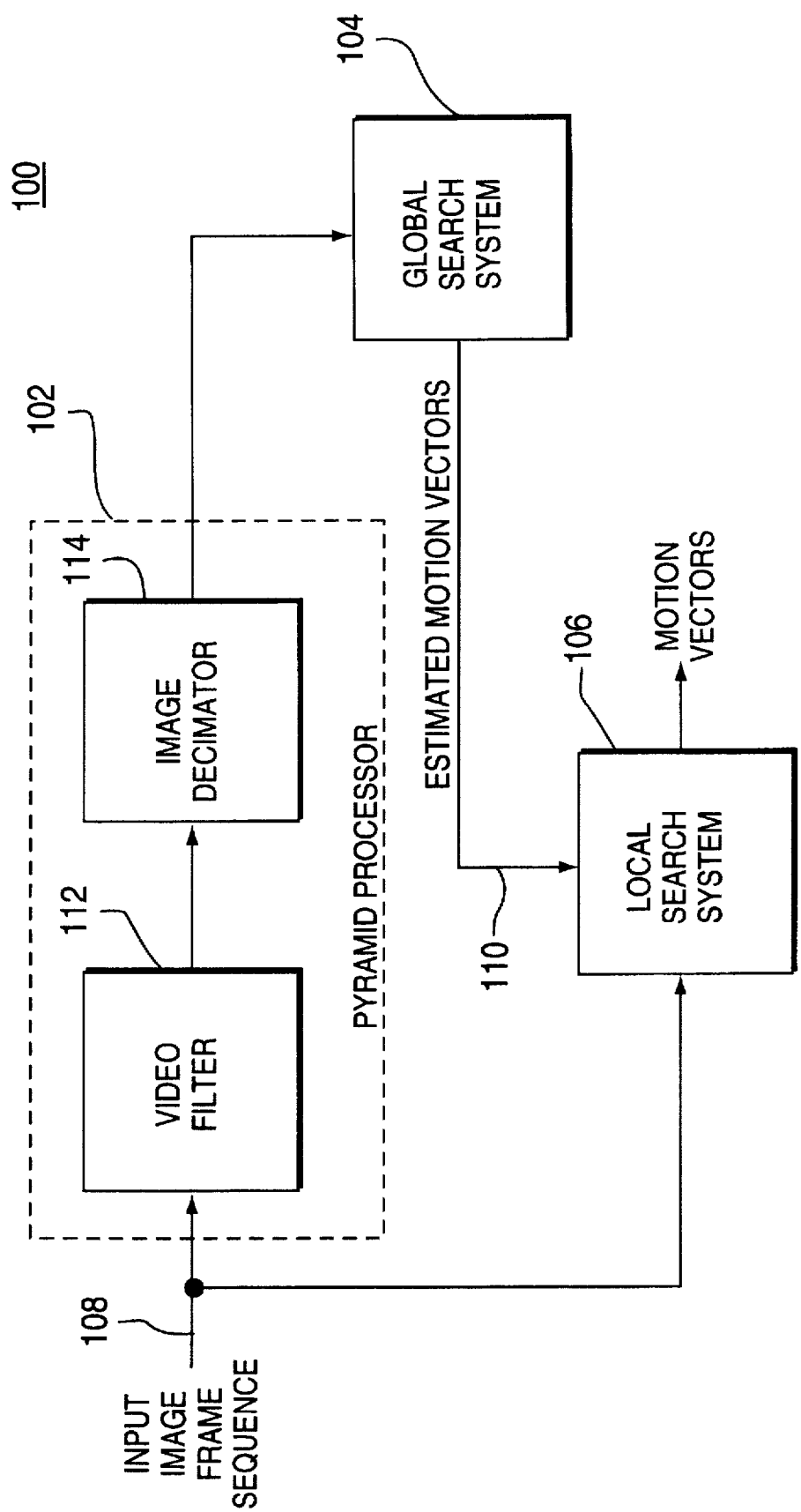
FIG. 1 is a block diagram of the global-to-local block motion estimation system of the invention.

FIG. 1 depicts a block diagram of a preferred embodiment of the present invention. The present invention, a global-to-local motion estimation system 100, contains a pyramid processor 102, a global search system 104 and a local search system 106. Specifically, a sequence of image frames form, at lead 108, an input to the motion estimation system 100. This image sequence is an input to both the pyramid processor 102 and the local search system 106. In general, the pyramid processor 102 filters (filter 112) and decimates (image decimator 114) each image frame as the frames arrive at the input, producing a sequence of reduced resolution image frames. The global search system 104 analyzes these reduced resolution frames to produce a plurality of estimated motion vectors. Lastly, the local search system 106 analyzes the input sequence of frames with the aid of the estimated motion vectors to produce a plurality of final motion vectors. These final motion vectors can then be used by a video processing system (not shown) to compress the video information within the image frames. More specifically, within the pyramid processor 102, the filter 112 is typically a Gaussian filter that performs weighted sum operations using adjoining pixel values within a frame. The filtered pixel is a normalized weighted sum of an input pixel with decreasing contributions from increasingly distant neighboring pixels. The image decimator 114 is a convention pixel subsampling circuit. The output of the pyramid processor is a sequence of image frames wherein each frame has a lesser resolution than its corresponding input frame. Illustratively, the decimator 114 is an eight times decimator that reduces the number of pixels in a given square area by $\frac{1}{64}$. Hereinafter, the frames produced by the pyramid processor 102 are referred to as the low resolution frames.

The global search system 104 compares two sequential low resolution frames to determine estimated motion vectors for the low resolution images. Specifically, the low resolution frames are partitioned into blocks of pixels such that a current frame contains a plurality of current blocks and a preceding frame contains a plurality of preceding blocks. The preceding blocks contain a greater number of pixels than the current block, e.g., each current block is 2 pixels by 2 pixels and each preceding block is 32 pixels by 32 pixels. Each current block is repetitively compared to a selected preceding block until a match is found, e.g., 4 pixels in the current block are compared to 4 pixels out of 1024 pixels in the preceding block, then the 4 current block pixels are moved and again compared, and so on. As such, within the low resolution search area, the system performs an exhaustive search that is hereinafter referred to as a global search. The blocks which produce the lowest computed error will be the match. Alternatively, when the computed error is less than a predefined error threshold, the routine deems a match found. When a match is found, the difference in location of the current block in the current low resolution frame and the location of the block of pixels that matches the current block within the preceding block define an estimated motion vector. This process is repeated for each current block until a motion vector is computed for each current block in the current low resolution frame. These estimated motion vectors are sent, via line 110, to the local search system.

The local search system 106 performs a modified exhaustive search (hereinafter referred to as a local search) using pixels within two consecutive full resolution frames in the input frame sequence. These two frames correspond to the two frames previously decimated by the pyramid processor 102 and compared by the global search system 104. The local search system partitions a current and preceding full resolution frames into a number of current blocks of pixels and a number of preceding blocks of pixels. The current block contains less pixels than the preceding block, e.g., each current block contains a 16 pixel by 16 pixel area and each preceding block contains 256 pixel by 256 pixel area. The local search system begins its comparison using the estimated motion vectors supplied by the global search system. As such, the comparison, within the full resolution frame, begins at a location that places the current block within a corresponding preceding block that is very near the "best" match location. The current block typically needs only a small amount of movement until a match is found. Thus, by using the estimated motion vectors, the local search is significantly faster than a conventional exhaustive search. The system output is a sequence of final motion vectors representing the motion from one frame to the next in the input frame sequence. Alternatively, the system may output the matched block of pixels within the preceding full resolution frame such that those matched pixels can be further processed by an image processing system.

Figure 2A:
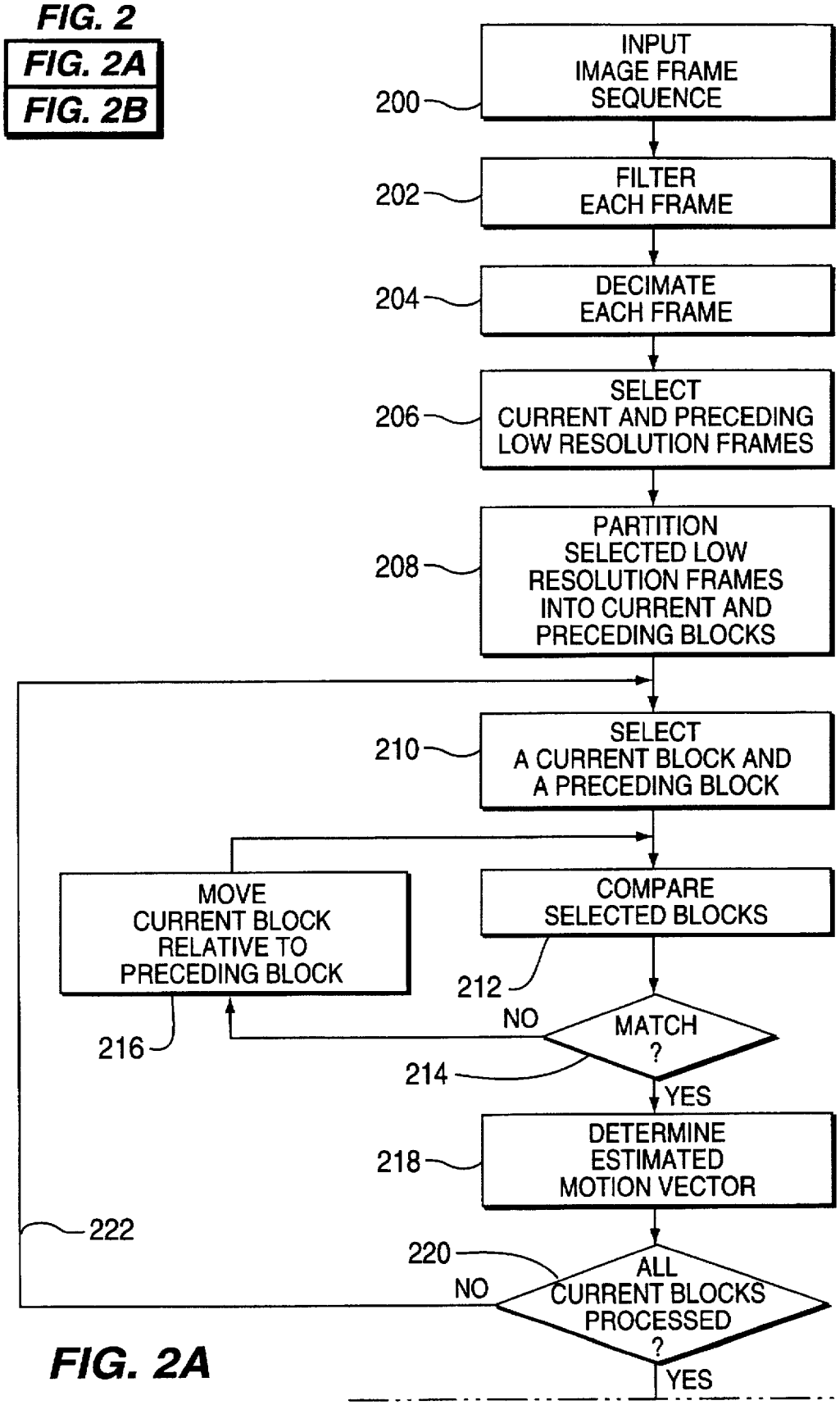
FIG. 2a and 2b depicts a flow chart illustrating the operation of the system shown in FIG. 1.
Figure 2B:
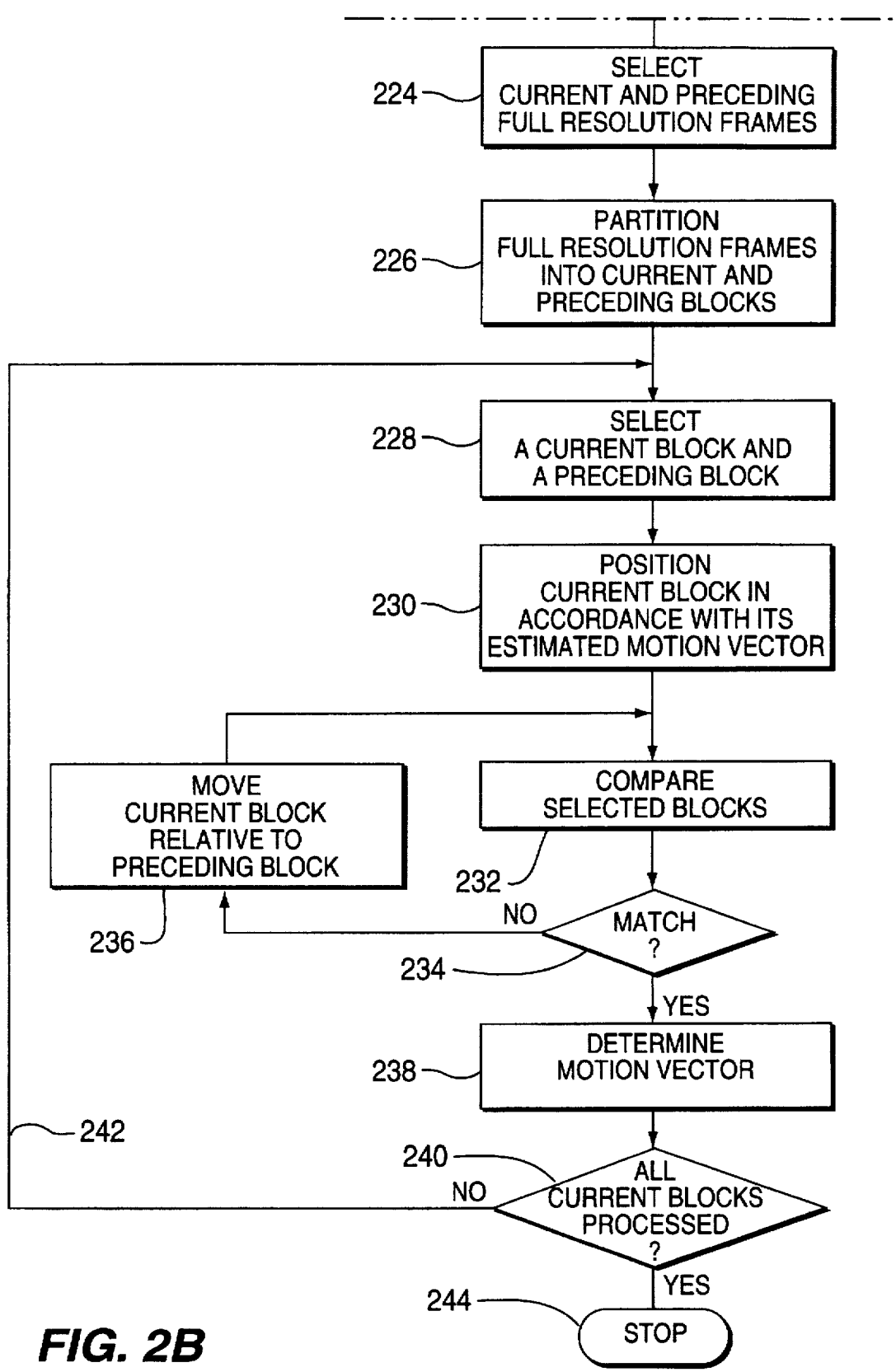
Figure 3:
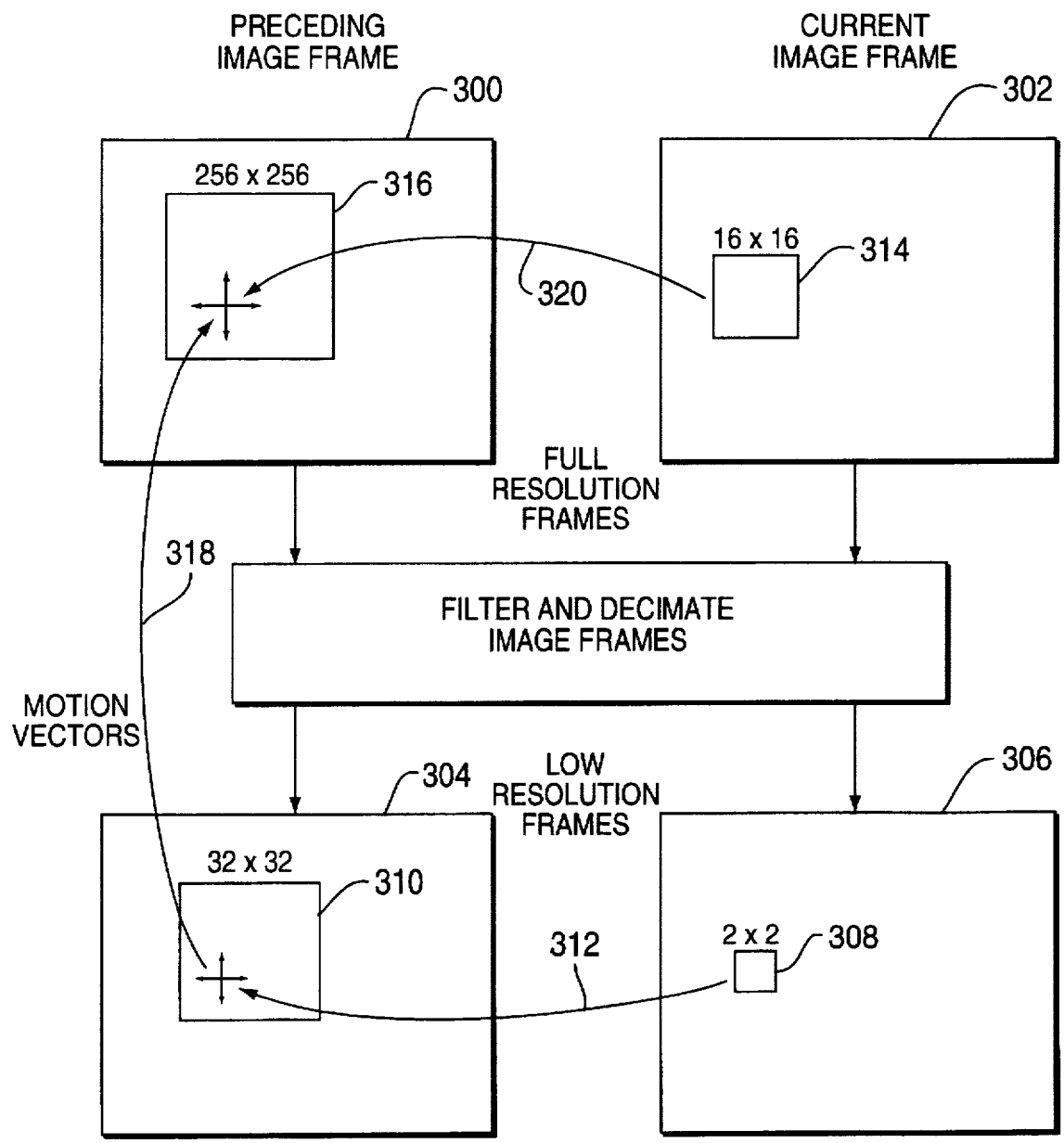
FIG. 3 is a representation of a sequence of images processed by the motion estimation system of FIG. 1.
Figure 4:
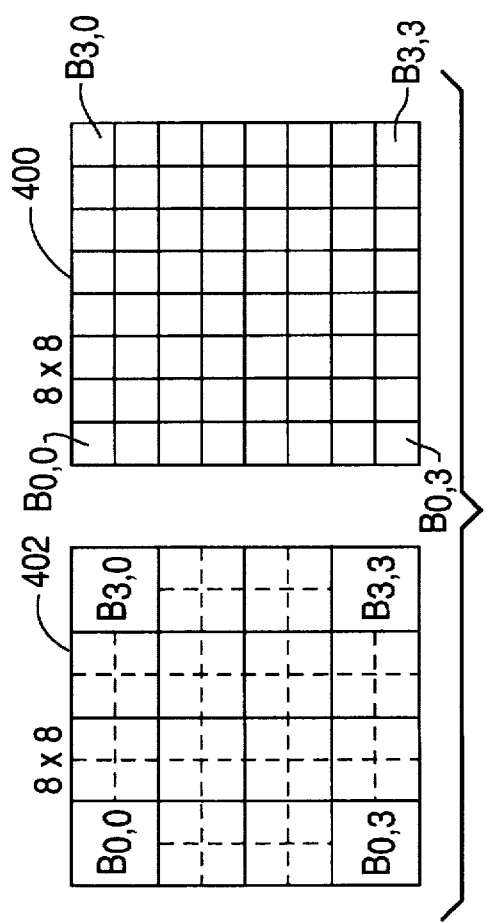
FIGS. 4 and 5 are representations of metablocks of pixels which are processed in an alternative embodiment of the motion estimation system of FIG. 1.

FIG. 2 depicts a flow chart of a routine that illustrates the operation of the system shown in FIG. 1. FIG. 3 depicts a representation of both current and preceding full and low resolution frames. To best understand the operation of the method of operation of the present invention, the reader should simultaneously consult both FIGS. 2 and 3.

At step 200, the full resolution frame sequence is input into the system. In FIG. 3, the full resolution frame sequence is represented by frames 300 (the preceding frame) and 302 (the current frame). At step 202 in FIG. 2, each frame is filtered, typically, by Gaussian filtering. Thereafter, at step 204, each frame is decimated to produce low resolution frames. These low resolution frames are depicted as frames 304 (preceding low resolution frame) and 306 (current low resolution frame). At step 206, the routine selects a current low resolution frame 306 and a preceding low resolution frame 304. The selected frames are partitioned, at step 208, into blocks of pixels, i.e., defining current and preceding blocks. At step 210, the routine selects a current block 308 and a corresponding preceding block 310. The corresponding preceding block defines a search area within which a match to the current block is sought. At step 212, the current and preceding blocks are compared (represented in FIG. 3 by arrow 312). The routine queries, at step 214, whether a match is found. If the answer to the query at step 214 is negative, the routine proceeds along the no path to step 216. At step 216, the routine repositions the current block within the preceding block and returns to step 212 where another comparison is accomplished. The routine loops through step 216 until a substantial match is found at step 214. One illustrative technique for making a match decision calculates the minimum square error or the mean absolute error for the various pixel comparisons performed by the global search system. The blocks which produce the lowest computed error will be the match. Alternatively, when the computed error is less than a predefined error threshold, the routine deems a match found. Thereafter, the routine determines, at step 218, an estimated motion vector for the current block presently being processed. Once the motion vector is computed, the routine queries, at step 220, whether all of the current blocks now have motion vectors associated with them. If not, the routine proceeds along the NO path 222 to step 210. At step 210, the another current block and associated preceding block are selected and, thereafter, processed (globally searched) to determine an estimated motion vector. If the query at step 220 is answered affirmatively, the routine proceeds to step 224. At this point, the routine has computed a set of estimated motion vectors for each and every current block in the current low resolution frame.

At step 224, the routine selects a current and preceding frame 302 and 300 from the full resolution input sequence that correspond to the current and preceding low resolution frames 306 and 304 used to determine the presently available set of estimated motion vectors. The selected input frames are partitioned, at step 226, into current and preceding blocks. Importantly, these current and preceding blocks correspond in position within the frame with the current and preceding blocks derived from the low resolution frames. As such, any given current or preceding block in the full resolution frames has a low resolution equivalent in the low resolution frames.

At step 228, the routine selects from the full resolution frames a current block 314 and a corresponding preceding block 316. The corresponding preceding block defines a search area within which a match to the current block is sought. At step 230, an estimated motion vector is used (represented in FIG. 3 by arrow 318) to initially position the current block 314 within search area defined by the preceding block 316. The estimated motion vector is the vector that is associated with the current block 308 within the low resolution frame that corresponds to the current block 314 in the full resolution frame 302. At step 232, the current and preceding blocks are compared (represented in FIG. 3 by arrow 320). The routine queries, at step 234, whether a substantial match is found. The local search system performs an exhaustive search using minimum square error or mean absolute error techniques to determine the "best"match between blocks. Since the initial position of the current block is estimated by the global search system, the required search range for the local search is typically only 2 to 4 pixels. If the answer to the query at step 232 is negative, the routine proceeds along the no path to step 236. At step 236, the routine repositions the current block 314 within the preceding block 316 and returns to step 232 where another comparison is accomplished. The routine loops through step 236 until a match is found at step 234. Thereafter, the routine determines, at step 238, a final motion vector for the current block presently being processed. Once the final motion vector is computed, the routine queries, at step 240, whether all of the current blocks now have final motion vectors associated with them. If not, the routine proceeds along the NO path 242 to step 228. At step 228, the another current block and associated preceding block are selected and, thereafter, processed to determine a motion vector. If the query at step 240 is answered affirmatively, the routine steps at step 244.

For simplicity, the illustrative preceding blocks 310 and 316 are depicted in FIG. 3 as respectively containing 256× 256 pixels and 32×32 pixels. However, in practice, these search areas require one extra row and one extra column of pixels to allow for movement of the current blocks 314 and 308 within the search areas. Therefore, the dimensions of the search areas are actually 256+1 pixels plus the length of the associated current block (16 pixels) and 32+1 pixels plus the length of the associated current block (2 pixels), respectively, in each dimension.

As previously described the low resolution current block 308 covers a 2×2 pixel area. Thus, the block contains only four pixels. As such, comparisons accomplished by the global search system using a current block containing only four pixels may produce unsatisfactory results. Specifically, spurious matches may be located by the global search system because the small number of pixels in the current block tend to correlate with noise.

Therefore, within the global-to-local block motion estimation system, an alternative to using a single low resolution current block uses a number of current blocks $B_{0,0}$ through $B_{n,n}$ arranged into a metablock 400 as shown in FIG.

4. In the preferred embodiment of the motion estimation system, a metablock 402 is formed of sixteen current blocks $B_{0,0}$–$B_{3,3}$. Specifically, each current block $B_{0,0}$–$B_{3,3}$ within the metablock 402 includes four pixels arranged in a 2×2 matrix corresponding to an undecimated 16×16 area within the current full resolution frame.

Figure 5:
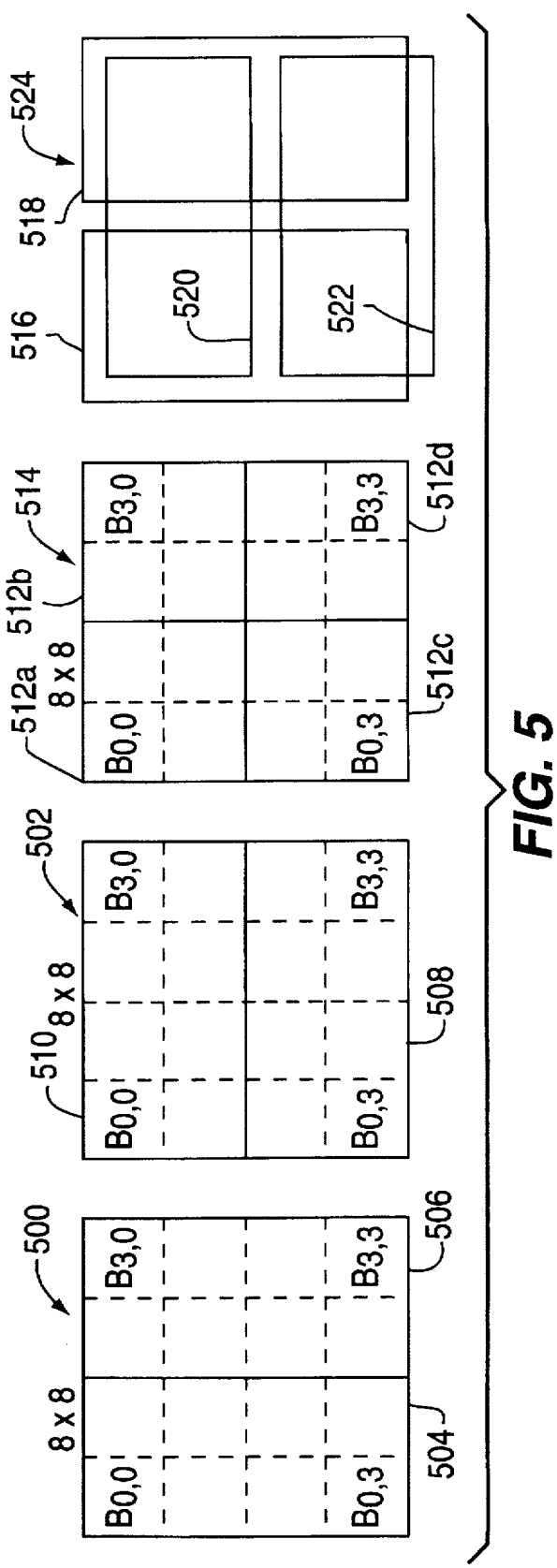

Referring to FIG. 5, there is shown the metablock divided into a number of differing test partitions (also referred to as sub-blocks). For example, the a metablock may be divided in half vertically to form metablock 500 having two test partitions 504 and 506 wherein each test partition includes four rows and two columns of current blocks. A metablock may also be divided in half horizontally to provide metablock 502 having two test partitions 508 and 510 wherein each test partition has two rows and four columns of test blocks. Within the block motion estimation system, a metablock may also be divided into any other convenient number of test partitions including, for example, into quarters to form the test partitions 512a–d within metablock 514 or into the overlapping test partitions 516, 518, 520, 522 within metablock 524.

Figure 6:
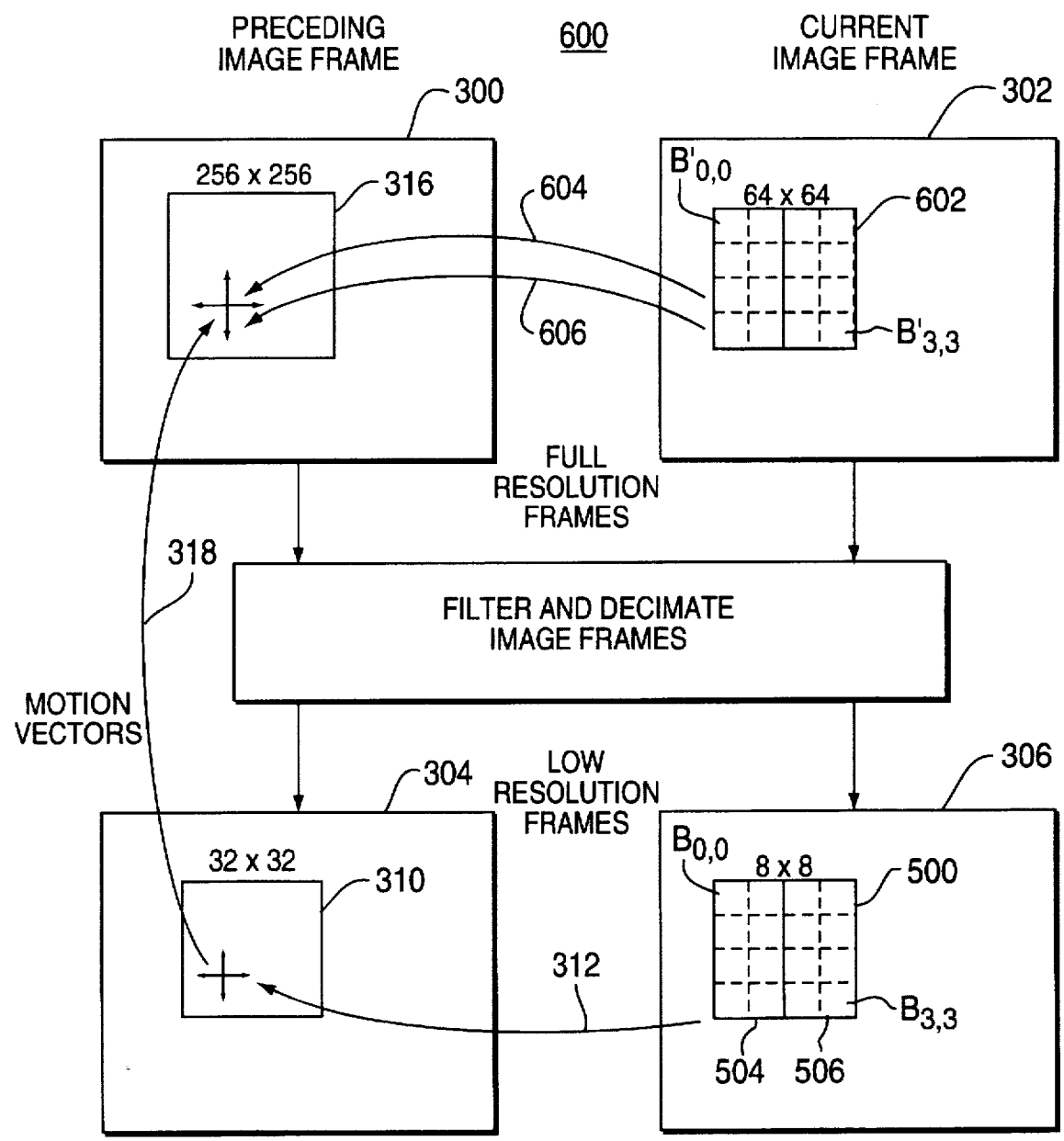
FIG. 6 is a representation of a sequence of images processed in an alternative embodiment of the motion estimation system of FIG. 1.

FIG. 6 shows an image processing representation 600 to demonstrate the use of metablocks in performing the global search. Within the image processing representation 600, the low resolution preceding frame 304 and the low resolution current frame 306 are the result of decimation operations performed by the filter and decimator upon the preceding input frame 300 and the current input frame 302, respectively, as previously described. As also previously described, the low resolution preceding block 310 is disposed within low resolution frame 304. The metablock 500 containing the low resolution current blocks $B_{0,0}$–$B_{3,3}$ is disposed within low resolution frame 306. When using metablocks, the global search system determines an estimated motion vector for each current block $B_{0,0}$–$B_{3,3}$ within each metablock.

An illustrative 64×64 pixel full resolution metablock 602, disposed within the current input frame 302, contains sixteen current blocks $B_{0,0}'$–$B_{3,3}'$ which each contain 16×16 pixel full resolution current blocks. Effectively, each test block $B'_{i,j}$ within the metablock 602 is operated upon by the decimator to provide a corresponding low resolution current block $B'_{i,j}$ within the metablock 500. As such, each $B'_{i,j}$ corresponds to a $B'_{i,j}$. The current full resolution frame 302 is covered with a plurality of metablocks such as the illustrative metablock 602. The metablocks 602 within frame 302 do not overlap with one another. Each 64×64 pixel metablock 602 of this plurality of metablocks corresponds to an 8×8 low resolution metablock such as metablock 500.

Using the global search, the metablock 500 is compared with the low resolution preceding block 310 (a low resolution search area) by the global search system for best match information. This comparison is represented by the arrow 312. In this manner, the global search system determines motion vector information for the overall metablock 500. Additionally, estimated motion vector information is determined for each of the test blocks $B_{0,0}$–$B_{3,3}$ within the metablock 500.

For example, each test block $B_{0,0}$–$B_{3,3}$ is simply assigned the motion vector information determined by the global search system for the overall metablock 500. This greatly simplifies the operation of the block motion estimation system. However, this method provides relatively low precision block motion estimation and poor image quality because the large size of the metablock may cause it to cover multiple objects moving in different directions.

To improve the accuracy of the motion vector estimate, the system determines an estimated motion vector for each partition (sub-block) of the metablock 500. For example, the metablock 500 may be partitioned to form metablock 514 as shown in FIG. 5. In this case, five estimated motion vectors are determined at each match location. Specifically, one motion vector is determined for the overall metablock 514 and one is determined for each of the four test partitions 512a–d. If a metablock is partitioned to form the metablock 524, one estimated motion vector is determined for the overall metablock 524 and one is determined for each of the four overlapping test partitions 516, 518, 520, and 522. In each of these metablocks, the estimated motion vectors for each partition is assigned to its constituent current blocks. If, however, multiple test partitions overlap a particular current block, then either one of the motion vectors is selected for that current block or the motion vectors are, in some manner, combined into a single vector to represent that current block. Such combination can be accomplished by averaging, weighted averaging, and the like.

In general, image quality can be increased by partitioning a metablock, determining the estimated motion vector information for each partition, and assigning the motion vector information for each partition to the blocks $B_{0,0}$–$B_{n,n}$ within the partition. Furthermore, image quality may be further increased by dividing the metablock into a larger number of partitions. However, if a metablock is partitioned into a plurality of 2×2 pixel blocks, the results are poor as previously described with respect to the 2×2 pixel block. Therefore, a reasonable partitioning tradeoff is made considering such factors as resistance to noise, spurious matches, the amount of hardware required, noise immunity and computational intensity.

As described previously, the use of partitioned metablocks in searching the low resolution frame produces multiple estimated motion vectors, i.e., one vector for the entire metablock and one for each partitioned area. These vectors are determined using techniques such as minimum square error to compute a best match for the metablock and its constituent components. These estimated vectors are then applied to the local search system as illustrated by pathway 318.

Thus, assuming a two partition metablock, e.g., metablock 500, the local search system must analyze three candidate locations wherein a minimum square error match was found by the global search system. These three locations correspond to the overall low resolution metablock and to each of the two partitions therein. One of the three possibilities must therefore be selected for each local test block $B_{0,0}'$–$B_{3,3}'$ in order to perform the search of the local search system.

One of the three possibilities can be eliminated immediately for each low resolution current block $B_{0,0}$–$B_{3,3}$ because each block $B_{0,0}$–$B_{3,3}$ is outside of one of the test partitions 504 and 506. For example, when selecting a starting location for the test block $B_{0,0}$ the candidate search location corresponding to the estimated motion vector for the test partition 506 can be ignored because the test block $B_{0,0}$ is not located inside the test partition 506. Only the candidate search locations corresponding to the overall metablock 500 and the test partition 504 must be considered.

In this manner, a motion vector is selected for each block $B_{0,0}$–$B_{3,3}$ based upon either the overall metablock 500 or one of the test partitions 504, 506 rather than based upon a single 2×2 pixel block $B_{0,0}$–$B_{3,3}$. Because the metablock 500 and the test partitions 504, 506 are much larger than the 2×2 blocks $B_{0,0}$–$B_{3,3}$, the global-to-local block motion estimation system has greater resistance to noise because 2×2 test blocks are more likely to match randomly with small bit patterns within the low resolution search area.

The selection of a final motion vector is accomplished by determining the best match of the full resolution block $B'_{i,j}$ for both of the two possible starting locations as indicated by the arrows 604 and 606. This involves selecting either the estimated motion vector corresponding to the overall metablock 500 or the appropriate test partition 504 and 506. When one of the two possible starting locations within search area 316 is selected, the local search system performs its search as previously described. In an alternate embodiment of motion estimation system, a full search can be performed for each of the two possible candidate search starting positions to provide two local search results. The better of the two local search results may be used to produce a motion vector. It is believed that this method may be less efficient than selecting a single estimated motion vector and performing a single search according to the selected motion vector.

Figure 7:
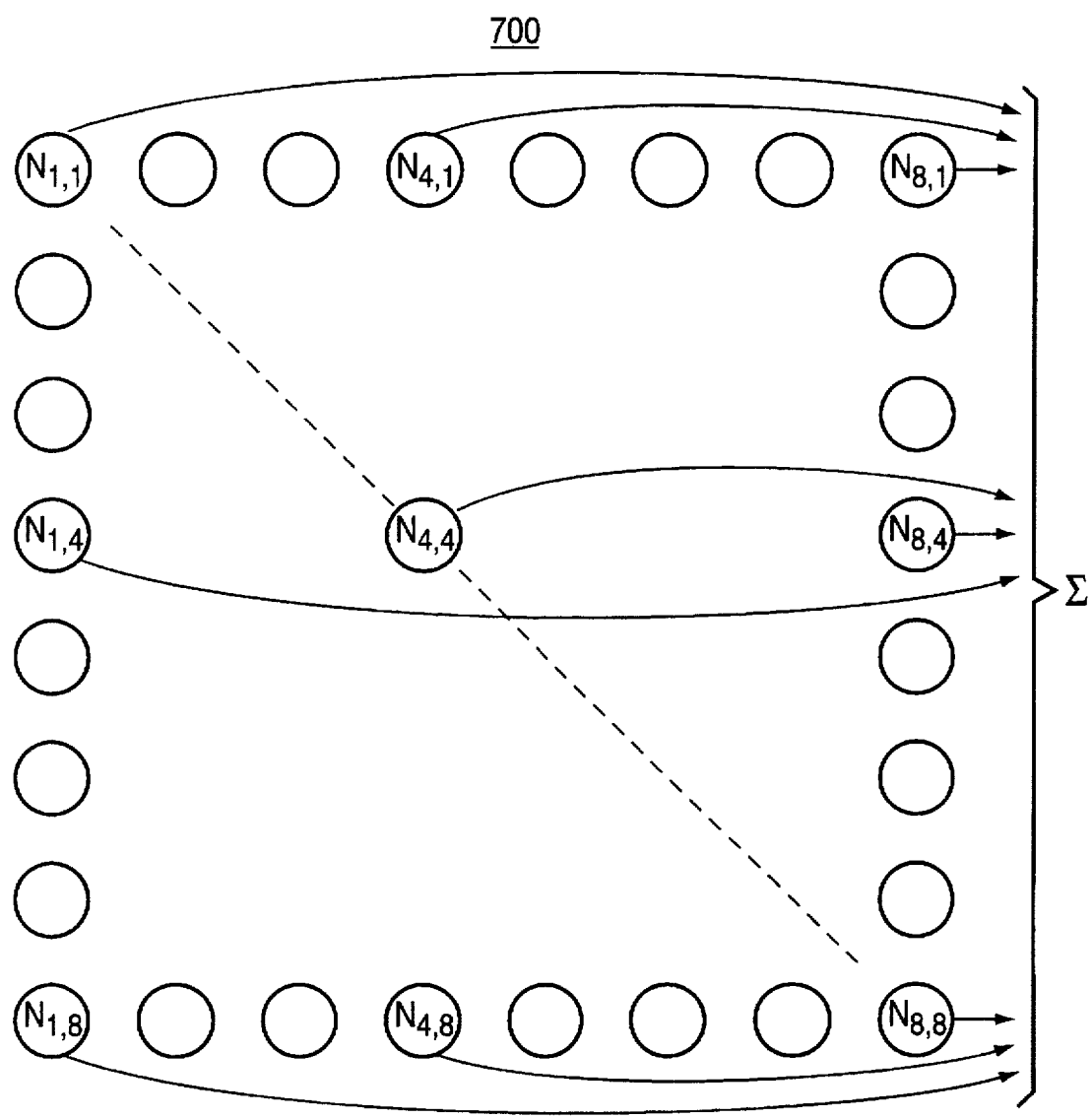
FIG. 7 is a representation a systolic array for use determining the motion vector information of sub-blocks within the metablocks of FIG. 5 within an alternative embodiment of the block motion estimation system of FIG. 1.

Referring to FIG. 7, there is shown an 8×8 systolic array 700. The systolic array 130 is a conventional systolic array which may be used within the global-to-local block motion estimation system to simultaneously determine the motion vector information of a metablock and each of the various test partitions within the metablock. Although the systolic array 700 provides a convenient way to make these determinations, any known method for determining motion vector information may be used to determine the motion vector information of the various possible partitions which may be formed by dividing a metablock.

The systolic array 700 is a conventional systolic array wherein each node $N_{i,j}$ receives its node input either from an array input or a node output, performs its node arithmetic operations, and applies its node output either to the array output or to the input of the another node. Therefore, when the differences determined by the comparisons of the global search system are applied to the systolic array, the estimated motion vector information may be calculated. In particular, the estimated motion vector information for various test partitions within the low resolution metablock 500 may be readily determined. The operations of the systolic array may be performed by program instructions executed by a computer or by separate hardware arithmetic circuits.

Within the metablock 500, the estimated motion vector information for the test partition 504 is obtained by summing the outputs of the nodes $N_{4,4}$ and $N_{8,4}$ of the systolic array. The estimated motion vector information for the test partition 506 is obtained by summing the outputs of the nodes $N_{4,8}$ and $N_{8,8}$. The estimated motion vector information for the overall metablock 500 is obtained by summing outputs of the motion vector information nodes $N_{4,4}$, $N_{4,8}$, $N_{8,4}$ and $N_{8,8}$.

Similarly, for the test partitions 508 and 510 of the metablock 502, the estimated motion vector information nodes $N_{4,4}+N_{4,8}$ and $N_{8,4}+N_{8,8}$ of the systolic array are summed. Within the test metablock 514, the estimated motion vector information node $N_{4,4}$ corresponds to the test partition 512a, the estimated motion vector information node $N_{4,8}$ corresponds to the test partition 512b, the estimated motion vector information node $N_{8,4}$ corresponds to the test partition 512c, and the estimated motion vector information node $N_{8,8}$ corresponds to the test partition 512d.

It will be appreciated by those skilled in the art that changes could be made to the embodiments described above without departing from the broad inventive concepts thereof. It is understood, therefore, that this invention is not limited to the particular embodiments disclosed, but it is intended to cover modifications within the spirit and scope of the invention as defined by the appended claims.

I claim:

1. A method for estimating motion vectors comprising the steps of:

providing a first image frame and a second image frame, each containing a plurality of pixels representing an image;

decimating a search area within said first image frame to produce a reduced resolution search area;

decimating a block of pixels in said second image frame to produce a metablock containing a plurality of reduced resolution blocks of pixels partitioned into pre-defined sub-blocks;

performing a global search within said reduced resolution search area using said metablock until said metablock substantially matches a matching block of pixels in said reduced resolution search area; and computing a plurality of estimated motion vectors representing a distance between a location of each of said reduced resolution pixel blocks within said metablock of said second image frame and a location of said matching block of pixels within said first image frame, where one estimated motion vector is computed for each of said reduced resolution pixel blocks and one estimated motion vector is computed for the metablock; and assigning the estimated motion vector of each said reduced resolution pixel blocks to each of said pre-defined sub-blocks within each reduced resolution pixel block.

2. The method of claim 1 further comprising the steps of:

selecting an estimated motion vector from said plurality of estimated motion vectors;

positioning, at an initial position defined by said selected estimated motion vector, a full resolution pixel block, from said second image frame, within a full resolution search area within said first image frame;

performing, from the initial position, a local search within said full resolution search area using said full resolution pixel block until said full resolution pixel block substantially matches a matching block of pixels in said full resolution search area; and computing a final motion vector representing a distance between a location of said full resolution pixel block within said second image frame and a location of said matching block of pixels within said first image frame.

3. The method of claim 1 wherein said assigning step is accomplished using a systolic array.

4. The method of claim 1 wherein said assigning step further comprises the steps of:

selecting a reduced resolution block of pixels from said plurality of reduced resolution blocks of pixels; and assigning an estimated motion vector to each of said pre-defined sub-blocks within said selected reduced resolution block of pixels, where said assigned estimated motion vector is selected from either the estimated motion vector computed for said metablock or one of the estimated motion vectors computed for said selected reduced resolution block of pixels.

5. The method of claim 1 wherein said assigning step further comprises the steps of:

selecting a reduced resolution block of pixels from said plurality of reduced resolution blocks of pixels; and assigning an estimated motion vector to each of said pre-defined sub-blocks within said selected reduced resolution block of pixels, where said assigned estimated motion vector is a combination of the estimated motion vector computed for said metablock and one or more of the estimated motion vectors computed for said reduced resolution blocks of pixels.

6. The method of claim 1 wherein said decimating steps further comprise a step of filtering each of said pixels in said first and second image frames.

7. The method of claim 1 wherein said first and second image frames are consecutive frames selected from a sequence of image frames.

8. Apparatus for estimating motion vectors having as an input a first image frame and a second image frame, each containing a plurality of pixels representing an image, said apparatus comprising:

a pyramid processor for decimating a search area within said first image frame to produce a reduced resolution search area and for decimating a block of pixels in said second image frame to produce a metablock containing a plurality of reduced resolution blocks of pixels partitioned into pre-defined sub-blocks;

global search means, connected to said pyramid processor, for performing a global search within said reduced resolution search area using said metablock until said metablock substantially matches a matching block of pixels in said reduced resolution search area; and means, connected to said global search means, for computing a plurality of estimated motion vectors representing a distance between a location of each of said plurality of reduced resolution blocks within said metablock of said second image frame and a location of said matching block of pixels within said first image frame, where one estimated motion vector is computed for each of said reduced resolution pixel blocks and one estimated motion vector is computed for the metablock; and means, connected to said global search means, for assigning the estimated motion vector of each said reduced resolution pixel blocks to each of said pre-defined sub-blocks within each reduced resolution pixel block.

9. The apparatus of claim 8 further comprising:

means for selecting an estimated motion vector from said plurality of estimated motion vectors;

means for positioning, at an initial position defined by said selected estimated motion vector, a full resolution pixel block, from said second image frame, within a full resolution search area within said first image frame;

local search means for performing, from the initial position, a local search within said full resolution search area using said full resolution pixel block until said full resolution pixel block substantially matches a matching block of pixels in said full resolution search area; and means for computing a final motion vector representing a distance between a location of said full resolution pixel block within said second image frame and a location of said matching block of pixels within said first image frame.

10. The apparatus of claim 8 wherein said assigning means is a systolic array.

11. The apparatus of claim 8 wherein said assigning means further comprises:

means for selecting a reduced resolution block of pixels from said plurality of reduced resolution blocks of pixels; and means for assigning an estimated motion vector to each of said pre-defined sub-blocks within said selected reduced resolution block of pixels, where said assigned estimated motion vector is selected from either the estimated motion vector computed for said metablock or one of the estimated motion vectors computed for said selected reduced resolution block of pixels.

12. The apparatus of claim 8 wherein said assigning means further comprises:

means for selecting a reduced resolution block of pixels from said plurality of reduced resolution blocks of pixels; and means for assigning an estimated motion vector to each of said pre-defined sub-blocks within said selected reduced resolution block of pixels, where said assigned estimated motion vector is a combination of the estimated motion vector computed for said metablock and one or more of the estimated motion vectors computed for said reduced resolution blocks of pixels.

13. The apparatus of claim 8 wherein said pyramid processor further comprises a filter for filtering each of said pixels in said first and second image frames.

14. The apparatus of claim 8 wherein said first and second image frames are consecutive frames selected from a sequence of image frames.

* * * * *